United States Patent [19]

Wilner

[11] 4,068,878
[45] Jan. 17, 1978

[54] CONTAINER LIFT COUPLING

[75] Inventor: Irving Wilner, Cranford, N.J.

[73] Assignee: The United States of America as represented by the Secretary of the Navy, Washington, D.C.

[21] Appl. No.: 727,504

[22] Filed: Sept. 28, 1976

[51] Int. Cl.² ............................................. B66C 1/66
[52] U.S. Cl. .......................... 294/83 R; 294/81 SF; 403/252
[58] Field of Search ............ 294/67 R, 67 DA, 78 R, 294/82 R, 81 R, 81 SF, 83 R, 89, 93; 24/221 R, 230.5 TD; 105/366 E, 366 B, 366 C, 366 D, 473, 475, 476, 484; 248/119 R; 296/35 A; 403/252, 316

[56] References Cited

U.S. PATENT DOCUMENTS

| 2,963,310 | 12/1960 | Abolins | 294/67 DA |
| 3,368,838 | 2/1968 | Reich | 294/81 SF X |
| 3,612,466 | 10/1971 | Arnold | 296/35 A X |
| 3,749,438 | 7/1973 | Loomis et al. | 294/81 SF |
| 3,892,436 | 7/1974 | Fathauer | 294/81 SF |

FOREIGN PATENT DOCUMENTS

| 2,305,001 | 8/1974 | Germany | 105/366 B |
| 1,271,299 | 4/1972 | United Kingdom | 294/81 SF |

Primary Examiner—Johnny D. Cherry
Attorney, Agent, or Firm—R. S. Sciascia; Henry Hansen; William J. Iseman

[57] ABSTRACT

A twist lock coupling for use in handling cargo containers of the type used in I.S.O. systems. An elongated support bar is inserted and rotated within an attachment fitting of the container. A keeper rotatable on the bar, and receivable on the fitting, includes a transverse recess for locking the bar in an orthogonal position thereto.

10 Claims, 6 Drawing Figures

1

CONTAINER LIFT COUPLING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to container lifting devices and particularly to a twist lock coupling device for use in handling cargo containers of the International Standards Organization System (hereinafter referred to as the I.S.O. system). It has now become almost standard practice while lifting containers, for example, by container handling cranes, to use twist locks which are adapted to engage apertured castings as provided on the containers. Containers of the I.S.O. system are of various heights and lengths, but are of the same width. The differences in the lengths of the containers are usually accommodated by means of, for instance, a telescopic type lifting spreader. Lifting spreaders tend to be large, heavy, cumbersome and expensive structural units which may not be available at all loading facilities. When lifting by means of aircraft, such as helicopters, the spreaders are often too heavy and difficult to use in airborne operations. The use of ordinary hooks to lift containers becomes dangerous since the hooks can easily become unattached when the lifting device sling or cable is slack.

SUMMARY OF THE INVENTION

Accordingly, it is an object of the present invention to provide a container lift coupling that is lightweight and does not necessitate the use of a cumbersome spreader mechanism. Another object of the invention is to provide a twist lock coupling device that is positive locking but requires only simple disengagement before unlocking. Yet another object of the present invention is to provide an inexpensive coupling device that is simple to use.

Briefly, these and other objects are accomplished by a container lift coupling having an elongated support bar for snug insertion and rotation in one attachment slot of a container corner lift fitting. A keeper member rotatable on the bar and receivable in the slot includes a transverse recess for locking the bar when orthogonal thereto. Thus, the support bar locks into an orthogonal position with respect to the keeper when the keeper engages the bar in the recess and is contained within the corner fitting slot. To remove the coupling, the bar is rotated from the orthogonal position while the keeper is lifted upwardly from the bar for disengagement therefrom.

For a better understanding of these and other aspects of the invention, reference may be made to the following detailed description taken in conjunction with the accompanying drawings.

DESCRIPTION OF THE PREFERRED EMBODIMENT

Figure 1:
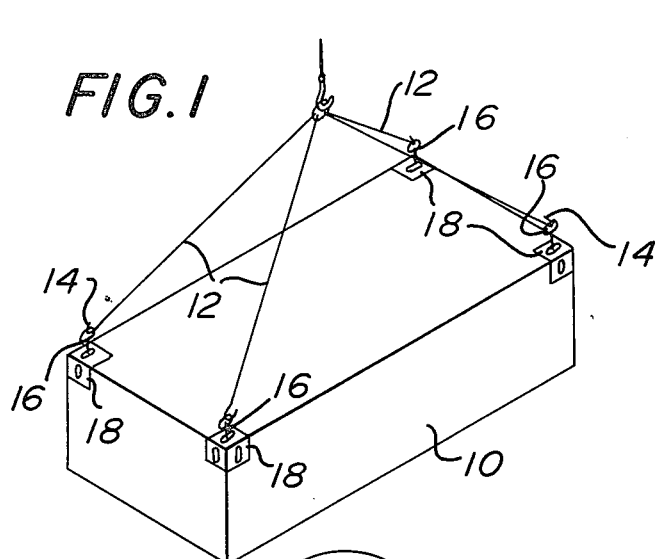
FIG. 1 is a perspective view of a typical cargo container supported by a plurality of lifting cables and attached thereto by the coupling of the present invention.

Referring now to FIG. 1, there is shown a typical container of the I.S.O. system type being operatively supported and lifted by a plurality of lifting cables 12 having at their respective one ends thereof a corresponding plurality of hooks 14. The cables are commonly joined at their respective other ends to any convenient lifting device such as a crane (not shown). Each of the hooks 14 engage a twist lock coupling 16 according to the present invention which is inserted and engaged with a corresponding lift fitting 18 shown positioned in the top corners of the container 10.

Figure 2:
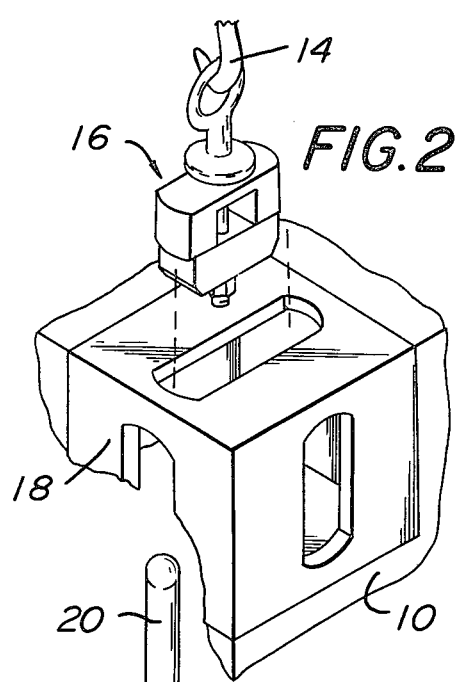
FIG. 2 is a fragmentary perspective view of a top corner fixture of the container of FIG. 1 with the coupling of the present invention shown about to be inserted therein.

FIG. 2 illustrates in a perspective view a magnified portion of the lift fitting 18 shown in FIG. 1 with the coupling 16 about to be inserted within an elongated and substantially rectangular slot formed within the top portion of the fitting 18. The fitting is a conventional casting having holes formed in the casting orthogonal to the attachment slot as shown and having a solid surface on the side opposite to the side in which the attachment slot is formed.

Figure 3:
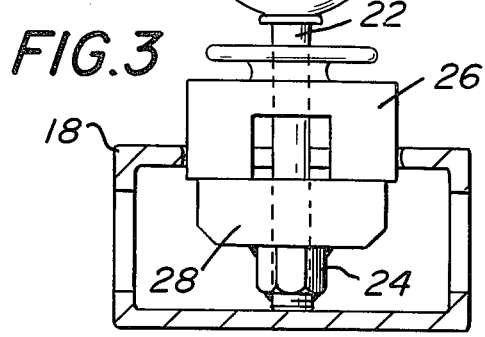
FIG. 3 is a side elevation view of the coupling of the present invention inserted into the casting shown in FIG. 2 shown in section.

Referring now to FIG. 3, there is shown a side elevation view of the coupling of the present invention as it is first inserted into a fitting 18 as shown in FIG. 2 and with the fitting shown in section to better illustrate the structural arrangement of the coupling 16. As earlier noted, the coupling 16 is dropped into the attachment slot of the fitting 18 so that the bottom of the coupling rests on the solid floor of the fitting. The coupling 16 comprises an eyelet 20 attached to an elongated cylindrical shank 22 which is threadingly secured with a nut 24 at the end thereof. Rotatably attached about the shank 22 is a keeper 26 having a transverse recess formed therein whose purpose will be explained in greater detail hereinafter. Fixedly attached to the shank 22 and positioned in parallel alignment with the keeper 26 is an elongated support bar 28 on which the keeper 26 is shown momentarily resting due to the weight of the keeper. Accordingly, the eyelet 20, the support bar 28 and the nut 24 form one movable member of the coupling device and move in unison with each other. To achieve this result, the individual components aforementioned may be fixed to one another in any convenient fashion such as, for example, by welding. Alternatively, the shank and support bar may be machined from a common stock with the eyelet or other convenient attachment arrangement attached to the free end of the shank after assembly of the coupling. As shown in the drawings, both the support bar and keeper have substantially equal respective lengths and widths. These dimensions, however, should be chosen to provide a snug but unencumbered fit within the slot of the corner fitting for convenient engagement and disengagement of the coupling.

Figure 4:
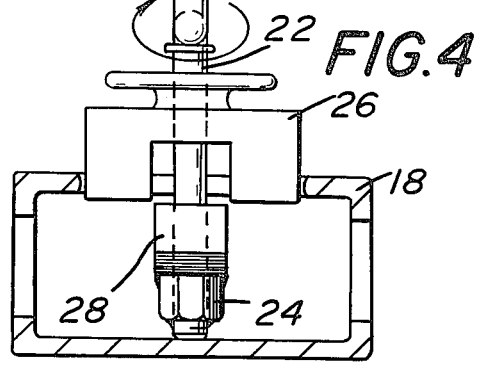
FIG. 4 is a side elevation view of the coupling of the present invention as shown in FIG. 3 with the support bar and eyelet turned 90°.

Referring now to FIG. 4, there is shown a side elevation view of the coupler similar to that shown in FIG. 3 but with the eyelet 20 and attached shank 22, support bar 28 and nut 24 being rotated 90° within the fitting 28 and with respect to the keeper 26. FIG. 4 illustrates the operation of the coupling device at an instant of time just before the keeper 26 falls in a downward direction sliding over the shank 22 to thereby engage the support bar 28 within the transverse recess of the keeper 26.

Figure 5:
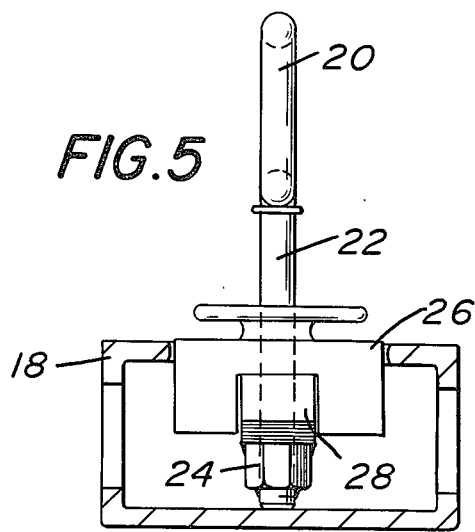
FIG. 5 is a side elevation view of the coupling of the present invention as noted in FIG. 4 with the keeper fully engaged with the support bar.

FIG. 5 illustrates a side elevation view of the coupling device similar to that shown in FIG. 4 but with the keeper 26 having descended due to gravitational forces and engaging the support bar 28 within the transverse recess of the keeper 26. At this point in time the coupler is locked within the attachment slot of the fitting 18 due to the locking arrangement between the support bar 28 and the fallen keeper 26 which itself is locked within the slot of the fitting 18 and in snug alignment with the sides of the slot.

Figure 6:
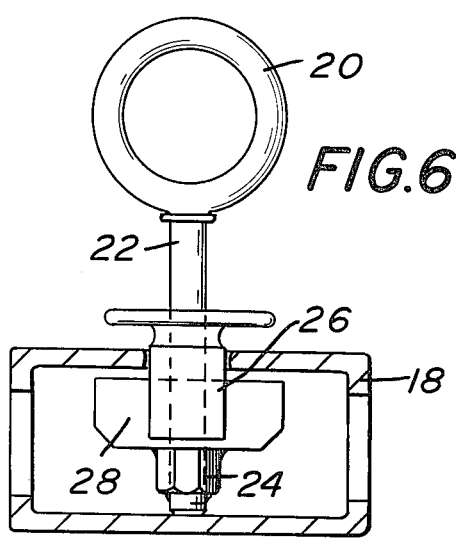
FIG. 6 is an elevation view of the present invention shown rotated 90° from the view in FIG. 5.

FIG. 6 is a side elevation view of the coupler of the present invention shown in a locked position and which view is rotated 90° from that shown in FIG. 5. More clearly shown is the arrangement of the locked support bar 28 with its elongated structure underneath and orthogonal to the keeper. The support bar 28, due to its elongated shape, provides a pair of segment members which extend perpendicularly from the shank 22 with each of the segments being of a sufficient length to contact the underside of the fitting adjacent the narrower portions of the slot.

Referring again to FIGS. 1-6, the operation of the invention will now be explained. Prior to insertion within the respective corner fittings 18 of the container 10, each of the couplings 16 are turned in such a manner as to provide a parallel arrangement between the keeper 26 and the underlying support bar 28. When so arranged, the coupling 16 may easily be dropped into the appropriate attachment slot at the top of the respective corner fittings 18. Having inserted and bottomed a coupling 16 within the fitting 18, the eyelet 20 is turned 90° in either direction which enables the keeper 26 to fall downwardly due to gravitational forces and to engage the support bar 28 within the transverse recess of the keeper 26 as shown in FIG. 5. At this point the coupling is locked within the corner fitting 18 and, with proper machining tolerances, provides a substantially snug fit within the fitting. Once locked within the fitting, the coupling may then be connected by means of the eyelet 20 to a lifting sling or cables 12 by means of hooks 14 or other well known arrangement. When the coupling is lifted upwardly by the cables 12, the elongated support bar cannot be pulled from the fitting 18 due to the bar segment members resting under the top surface of the fitting. The support bar 28 is prevented from turning within the coupling 16 and thus possibly releasing due to the latching action of the engaged keeper 26 which itself is locked within the recess of the attachment slot of the fitting 18. To disengage the coupling from the fitting, the support cables 12 are slackened and the keeper 26 is lifted upwardly a short distance sufficient to allow a 90° rotation of the eyelet 20 and support bar 28 to restore a parallel alignment of the keeper and support bar as shown in FIG. 3. Means for manually lifting the keeper from the support bar are provided by the annular ring formed at the top of the keeper and which ring is always positioned external to the fitting even when the coupling is engaged therein. Of course, other well known lifting structure may be utilized to lift the keeper either by manual or automatic means. Once linearly aligned with one another, the support bar 28 and other associated coupling structure is easily withdrawn from the slot of the fitting 18.

Thus it may be seen that there has been provided a novel container lift coupling which is light weight, easy to use, and positive locking by gravitational force.

Obviously, many modifications and variations of the invention are possible in light of the above teachings. It is therefore to be understood that within the scope of the appended claims, the invention may be practiced otherwise than as specifically described.

What is claimed is:

1. A twist lock coupling for a hollow lift fitting having a slot therethrough, comprising, in combination:
   a shank member for inserting in the slot and having an elongated shank portion adapted to be connected at one end to a lifting device and having at the other end a pair of opposed segments laterally extending in opposite directions from said shank portion formed to closely fit through the slot when parallelly aligned therewith and to engage the inside of the lift fitting on either side of the slot when orthogonally aligned therewith; and
   a locking member rotatably and slidably disposed on said shank portion intermediate the ends and laterally extending in opposite directions from said shank portion and formed to fit in the slot when parallelly aligned therewith, said locking member having a recess formed therein for non-rotatable gravitational engagement with said segments and the fitting when said shank member is inserted in the slot with said segments orthogonally aligned below the slot, thereby locking said shank member in the lift fitting.

2. The coupling of claim 1 wherein said locking member comprises means formed to extend above the slot to permit lifting of said locking member to disengage said locking member from said shank member and to permit alignment of said segments with the slot for removing the coupling therefrom.

3. The coupling of claim 2 wherein:
   said segments are rectangular and concentric with said shank portion; and
   said locking member recess is a rectangular groove concentric with said elongated shank portion and formed on the side of said locking member adjacent said segments, said groove having a width equal to the width of said segments for engagement therewith.

4. The coupling of claim 3 wherein the widths and lengths of said segments and said locking member are substantially equal.

5. The coupling of claim 4 wherein said shank portion has an eyelet axilly formed at the said one end.

6. A twist lock coupling for a lift fitting, comprising, in combination:
   an elongated shank adapted to be connected at one end to a lifting device and to be inserted from one end into the fitting;
   a support member formed to be received in the fitting when aligned therewith and to engage the fitting when not aligned therewith and secured to the other end of said shank; and
   a locking member rotatably and slidably disposed on said shank and formed to be inserted in the lift fitting when aligned therewith, said locking member having a recess formed therein for non-rotatably gravitational engagement with said support member when said support member is engaged and said locking member is received in the fitting, thereby locking said support member in the lift fitting.

7. The coupling of claim 6 wherein said locking member comprises means formed to extend above the fitting to permit lifting of said locking member to disengage said locking member from said support member and to permit alignment of said support member with the fitting for removing the coupling therefrom.

8. The coupling of claim 7 wherein:

said support member is rectangular and concentric with said shank; and said locking member recess is a rectangular groove concentric with said elongated shank and formed on the side of said locking member adjacent said support member, said groove having a width equal to the width of said support member for engagement therewith.

9. The coupling of claim 8 wherein the widths and lengths of said support member and said locking member are substantially equal.

10. The coupling from claim 9 wherein said shank has an eyelet axially formed at the said one end.

* * * * *